United States Patent
Franey et al.

(10) Patent No.: US 9,314,002 B2
(45) Date of Patent: Apr. 19, 2016

(54) ELECTROLUMINESCENT PET COLLARS, LEASHES AND PERSONAL SAFETY DEVICES

(71) Applicant: DogBrite LLP, Baldwin, WI (US)

(72) Inventors: David Franey, Baldwin, WI (US); Gordon Patenaude, Champlin, MN (US); Paul J. Gelardi, Biddeford, ME (US)

(73) Assignee: DogBrite LLP, Baldwin, WI (US)

( * ) Notice: Subject to any disclaimer, the term of this patent is extended or adjusted under 35 U.S.C. 154(b) by 241 days.

(21) Appl. No.: 14/012,365

(22) Filed: Aug. 28, 2013

(65) Prior Publication Data

US 2014/0233220 A1    Aug. 21, 2014

Related U.S. Application Data

(60) Provisional application No. 61/693,934, filed on Aug. 28, 2012.

(51) Int. Cl.
*A01K 27/00* (2006.01)
*F21V 33/00* (2006.01)

(52) U.S. Cl.
CPC ........... *A01K 27/006* (2013.01); *F21V 33/0008* (2013.01)

(58) Field of Classification Search
CPC .. F21V 33/0008; A01K 27/00; A01K 27/004; A01K 27/006
USPC ..................... 362/183, 157, 84, 103; 119/792
See application file for complete search history.

(56) References Cited

U.S. PATENT DOCUMENTS

| | | | |
|---|---|---|---|
| 3,935,443 A | 1/1976 | Simmons | |
| 4,513,692 A | 4/1985 | Kuhnsman | |
| 4,887,552 A | 12/1989 | Hayden | |
| 5,074,011 A * | 12/1991 | Carlson | A01K 27/00 24/170 |
| 5,950,571 A | 9/1999 | Schade | |
| 5,967,095 A * | 10/1999 | Greves | A01K 27/006 119/792 |
| 6,085,698 A | 7/2000 | Klein | |
| 6,170,959 B1 | 1/2001 | Richardson, III | |
| D453,386 S | 2/2002 | Philipson | |
| 6,925,967 B1 * | 8/2005 | Woodruff | A01K 27/004 119/712 |
| 7,011,427 B1 | 3/2006 | Baez | |
| 7,594,482 B1 * | 9/2009 | Toplin | A01K 27/006 119/792 |
| 7,690,331 B2 | 4/2010 | Hurwitz | |
| 8,182,108 B2 | 5/2012 | Pearson | |

(Continued)

FOREIGN PATENT DOCUMENTS

WO    9639024 A1    12/1996
WO    2006022781 A2    3/2006

*Primary Examiner* — Anabel Ton
(74) *Attorney, Agent, or Firm* — James Creighton Wray; Meera P. Narasimhan

(57) ABSTRACT

Collar, harness or leash mounted electroluminescent strips are powered by an electronic inverter circuit and batteries inside a plastic housing. A lid on the housing is thinned around a central push button. An extension of the push button activates or deactivates a push switch in the base. An O-ring in a peripheral groove on the base seals a complementary peripheral projection of a lid. Cylinders extend from sides of the base. Knurled and threaded inserts are held in the cylinders. Complementary lid lugs hold set screws which are screwed into the inserts, tightly compressing the O-ring. Knurls on the base and a keeper opposite the knurls hold the housing on the collar. An opening for the electroluminescent strips is partially surrounded by the lugs.

18 Claims, 18 Drawing Sheets

(56) References Cited

U.S. PATENT DOCUMENTS

| | | | |
|---|---|---|---|
| 8,522,728 B2 * | 9/2013 | Davis, Jr. | A01K 27/001 119/863 |
| 8,919,293 B2 * | 12/2014 | Cromwell | A01K 27/001 119/794 |
| 2006/0162674 A1 | 7/2006 | Neiser | |
| 2011/0120388 A1 | 5/2011 | Shahbaz | |

* cited by examiner

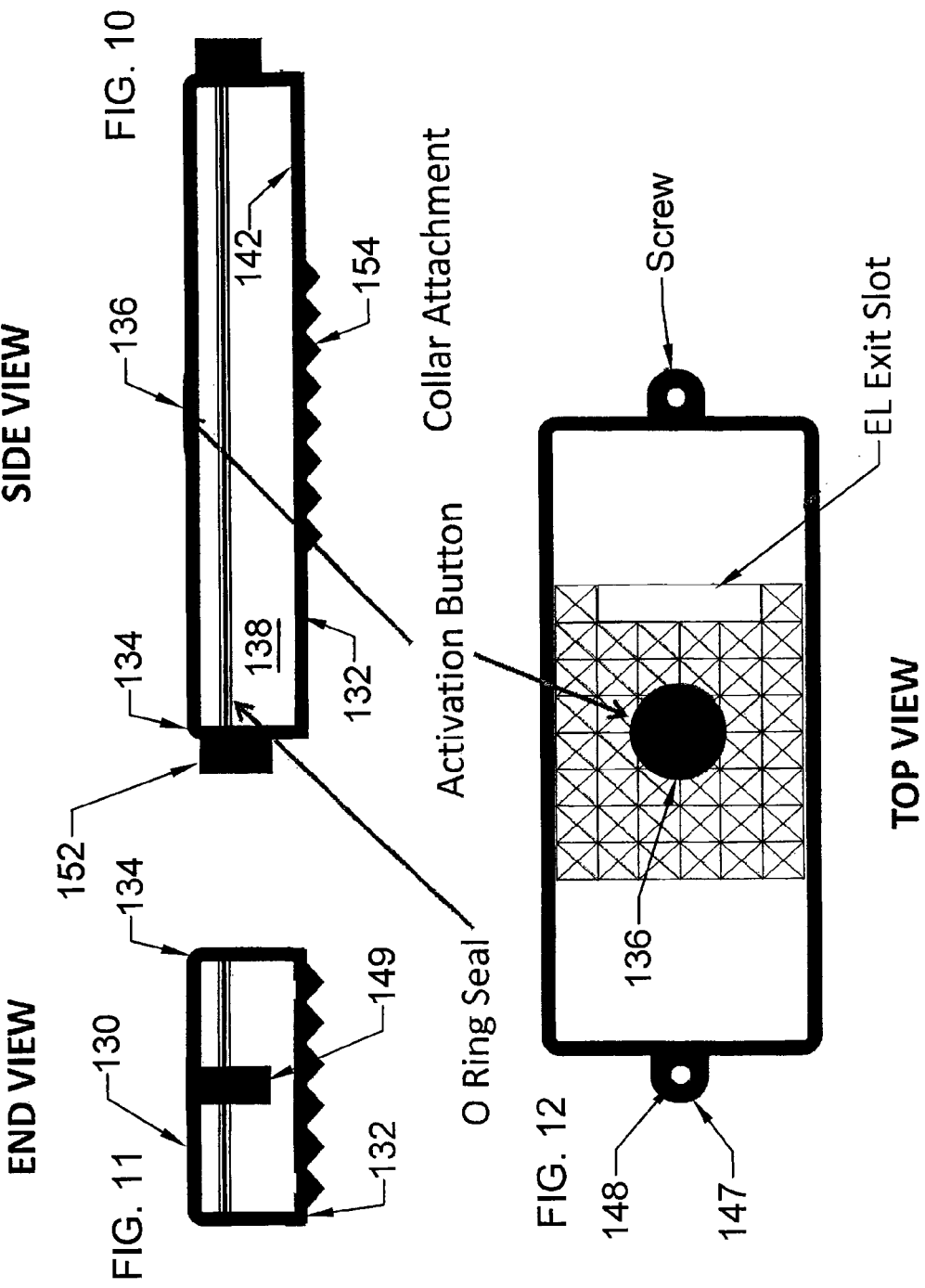

On / Off Button

- The button is molded into the top plastics.
- The top of the plastic housing is thin molded around the button to allow the plastics to flex down and push the switch on the circuit card Thin molded plastic for flexibility

- The molded in collar attachment

Lower Housing Attached to Collar

EL Strip spec for medium and large sizes

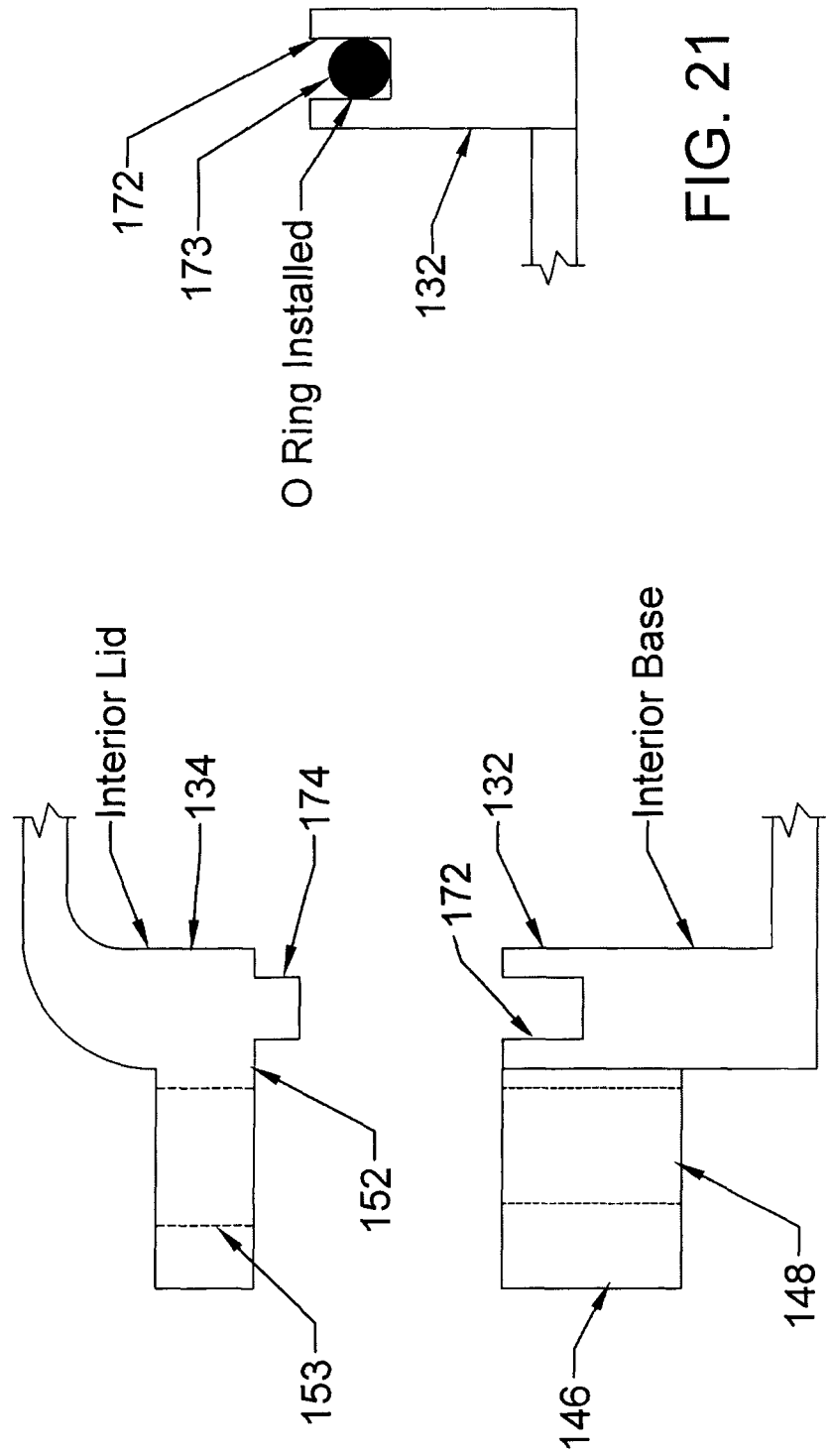

EL Strip Exit Hole Bottom View

Lower Housing EL Strip Exit Hole

Lid Side View

Lid End View

ELECTROLUMINESCENT PET COLLARS, LEASHES AND PERSONAL SAFETY DEVICES

BACKGROUND OF THE INVENTION

This application claims the benefit of U.S. Provisional Application No. 61/693,934, filed Aug. 28, 2012, which is hereby incorporated by reference in its entirety as if fully set forth herein.

SUMMARY OF THE INVENTION

The invention is a safety device for use in devices for the mobile restraint, or control, of animals. An example of the invention would be used while taking an animal for a walk. The invention also can be used for safety clothing or harnesses for people. Examples would be safety straps for children and workmen, runner's belts and safety vests.

One embodiment of the invention for use as a restraint (leash) utilizes a reeling device to retract the restraint. A reeling spool incorporates an inverter and battery pack inside the center of the spool, allowing for a direct connection to the electroluminescent wire or ribbon, eliminating moving contacts and minimizing the complexity, size and weight of the reeling device. The electronics and batteries are on a plane that bisects the inner diameter of the reel so that the printed circuit board is in the same plane as the ribbon. When the batteries are rechargeable, a port or plug is constructed in a side of the spool for charging the batteries. This allows the electroluminescent ribbon to be directly wired to the circuit board with no additional wires or twisted connections.

An embodiment of the invention for use as a restraint (leash) utilizes a reeling device to retract the restraint. Such spool incorporates an inverter and rechargeable battery inside the center of the spool allowing for a direct connection to the electroluminescent wire or ribbon, eliminating moving contacts. A port or plug for insertion to a charging device is at the end of the leash. A printed circuit on the back of the electroluminescent ribbon provides power to the rechargeable battery. This configuration minimizes the complexity, size and weight of the reeling device and allows the leash also to act as an extended charging cable.

An alternate embodiment of the invention for use as a restraint (leash) utilizes a reeling device to retract the restraint. Such spool incorporates an inverter inside the center of the spool allowing for a direct connection to the electroluminescent wire or ribbon eliminating moving contacts and a rechargeable battery pack is mounted on the end of the leash and includes a plug or port for connection to a charging device. A printed circuit on the back of the electroluminescent ribbon provides power to the electronics. This configuration minimizes the complexity, size and weight of the reeling device and places the battery and charging port or plug at the end of the leash so that the leash also acts as an extend charging cable.

An alternate embodiment of the invention for use as a restraint (leash) utilizes a reeling device to retract the restraint. An inverter and rechargeable battery pack is mounted on the end of the leash and includes a plug for insertion to a charging device. This configuration minimizes the complexity, size and weight of the reeling device and places the battery, inverter and charging port or plug at the end of the leash so that the leash also acts as an extended charging cable.

Dogs' ears are sensitive to sound so a further embodiment is to attenuate the sound that comes from the inverter by potting in encapsulating it in epoxy, silicone or other dielectric sound deadening material.

One example of a pet leash places the battery pack adjacent the pet collar attachment so that the pet carries the battery pack.

Currently there are incandescent, and LED products available which are illuminated in some manner. The incandescent and LED versions either have one or more discrete points of light, or a few points of light with a light pipe to extend the light around the collar or down a leash. Some have the light, light pipe and battery pack inserted into or mounted onto a flexible leash or collar. Some illuminated leashes are like flashlights with a leash attached. Electroluminescent wire leashes are available with a battery pack and inverter in a handle and a hook attached to the end of the illuminating wire.

The prior art devices are deficient because of the manner in which they illuminate. The ones with discrete points of light must be bright to be seen and therefore tend to glare and be blinding to the animal and persons in close proximity. Certain prior art devices that use a flexible plastic light pipe to distribute the illumination do not do so evenly, and the light pipe adds significantly to the weight of the device. The electroluminescent wire versions either use a small wire to get adequate flexibility or use a larger diameter wire to get strength and thereby loose flexibility.

The present invention allows use of small diameter wire and/or narrow flat ribbon to optimize illumination and flexibility, minimize weight. Sheathing the small wire or ribbon within transparent or translucent reinforcing material achieves tensile strength.

The sheathed reinforcement is executed such that the electroluminescent wire and/or ribbon is not affixed or constrained by such reinforcement but is allowed to move longitudinally so as to absorb a load or shock. The ability of the relatively ridged wire and/or ribbon to move longitudinally within the flexible reinforcing sheath allows the wire and/or ribbon to be sized for illumination and flexibility without having to increase its size to increase its strength. The sheath reduces cost as well as avoids compromising flexibility for strength, since the sheath bears the load and shock not the EL wire/tape.

The invention is a device made from electro-luminescent ("EL") wire (round) or EL tape (flat) that is sheathed in a woven or braided mesh to allow the wire or ribbon to be strong enough to absorb the tensile forces associated with the use of the device and visually translucent enough to allow the illumination from the EL wire or tape to be visible. The sheath can be transparent, translucent of have a transparent or translucent section to allow the light to be visible.

The inverter/battery pack is connected to the EL wire/tape directly or with a connector and is sheathed inside a flexible reinforcing material, or mounted to the outside surface, in a manner that isolates load bearing forces from the EL wire or tape.

The inverter/battery pack is constructed with a flexible membrane to seal it from moisture so that it can survive getting wet.

A pet or child restraint has an elongated flexible body. An electroluminescent strip is mounted on the elongated flexible body. A power supply housing is connected to the electroluminescent strip and is mounted on the elongated flexible body. The power supply housing has a base connected to the electroluminescent strip and mounted on the elongated flexible body. A removable lid is connected to the base. Batteries and an electronic circuit are mounted in the housing. The base has a knurled outer surface portion for positioning against the elongated flexible body. A keeper is mounted on an opposite side of the elongated flexible body and is secured to the base for pressing the knurled surface tightly against the elongated flexible body.

The removable lid has a push button, and a flexible portion surrounding the push button. An off-on switch is mounted on an inside bottom of the base. The lid has an inward extension extending from the push button to the switch for turning the switch on or off.

The base has a peripheral groove. The lid has a complementary peripheral extension for fitting in the groove. An O-ring is positioned in the groove for compression when forcing the peripheral extension against the O-ring for sealing the peripheral extension in the groove. Cylinders extend from the base. Inserts are fixed in the cylinders. Complementary lugs extend outward from the lid. Fasteners extend through the holes in the lugs into the inserts for securing the lid to the base.

An opening in the base through which the electroluminescent strips or connectors extend is partially surrounded by the knurled portion. A safety device adapted for use in mobile restraint or control of animals or in safety clothing for people or harnesses for children has electroluminescent wires or electroluminescent ribbons sheathed in a woven or braided mesh to allow the wire or ribbon to be strong enough to absorb the tensile forces associated with the use of the device and visually translucent enough to allow the illumination from the electroluminescent wires or ribbons to be visible.

The sheath is transparent, translucent or has a transparent or translucent sections to allow the light to be visible.

An inverter/battery pack is connected to the electroluminescent wires or ribbons directly or with connectors. The inverter/battery pack is mounted inside a housing having a securable sealed lid.

In one form, the safety device is a leash that utilizes a reeling device to retract the restraint.

The reeling spool incorporates an inverter and battery pack inside the center of the spool, allowing for a direct connection to the electroluminescent wire or ribbon and eliminating moving contacts. The electronic circuit and batteries are on a plane that bisects the interior diameter of the reel, so that the printed circuit board is in the same plane as the ribbon. The batteries are rechargeable. A port or plug is constructed in a side of the spool for charging the batteries.

The safety device places the battery pack on a pet collar attachment so that the pet carries the battery pack.

These and further and other objects and features of the invention are apparent in the disclosure, which includes the above and ongoing written specification, with the claims and the drawings.

BRIEF DESCRIPTION OF THE DRAWINGS

FIG. 10 is a side elevation of a battery and electronics housing for attachment to a collar or leash.

FIG. 11 is an end elevation of the housing shown in FIG. 10.

FIG. 12 is a top view of the housing shown in FIGS. 10 and 11.

FIG. 20 is the corner detail of a housing base and lid.

FIG. 21 is a detail of an O-ring installed in the housing base groove.

DETAILED DESCRIPTION

Figure 1:
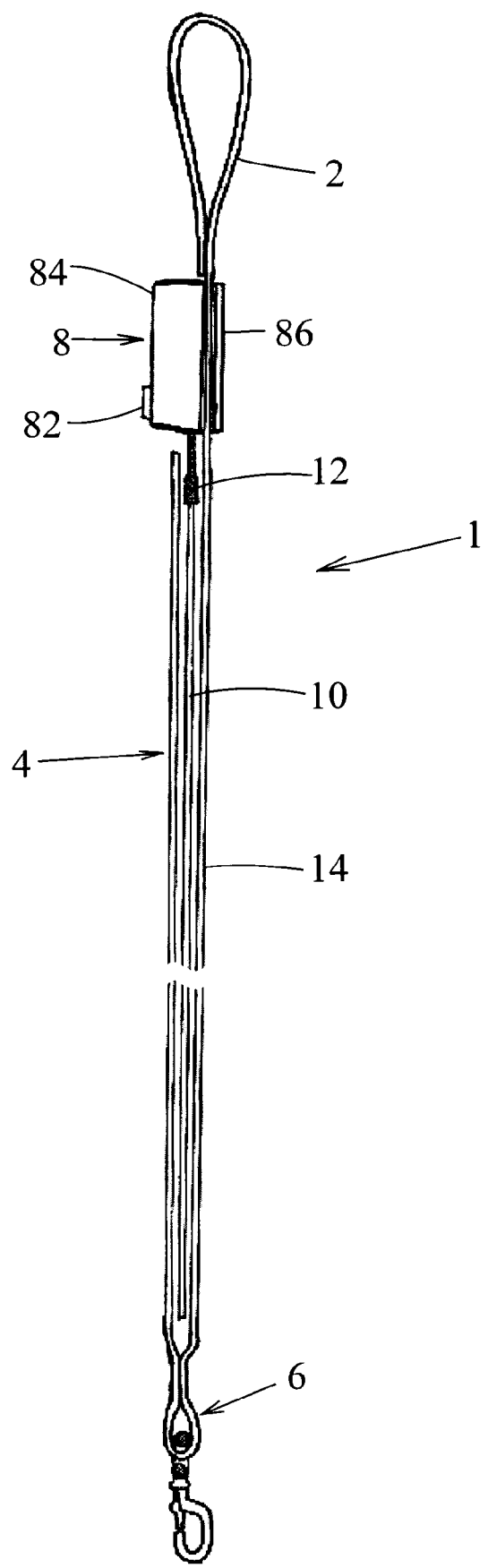
FIG. 1 is a side view of a foreshortened dog leash enclosing an electroluminescent tape.

FIG. 1 is a side view of a foreshortened dog leash enclosing an electroluminescent tape. An animal leash has a hand loop portion 2, a middle section strap portion 6. A power supply 8 is mounted on the strap 4 near the hand loop. An electroluminescent tape 10 extends some portion of length of the strap 4. A power supply 4 has DC batteries, which may be rechargeable, an inverter and may be directly wired together or include a dual connector 12.

Connector 12 connects bare wires that run along opposite sides of the electroluminescent tape. The electroluminescent tape floats between the strong translucent cover 14, which resist pulling stresses. The cover may be a fabric with an open weave with fibers or yarn, through which light emitted by the tape is visible. Cover 14 may be a strong, transparent, flexible plastic.

Power supply 8 is encased in plastic, rubber or a strong material. A button 82 is used to switch ON and OFF power supply 8. Button 82 may be a flexible part of the unitary top 84 of the power supply. Two screws hold the top 84 to the base 86, which is clamped, bonded, riveted or otherwise attached to the leash strap. A rubber gasket seals top 84 and base 86. When rechargeable batteries are use, the power supply 8 is enclosed by a sealed container.

Figure 2:
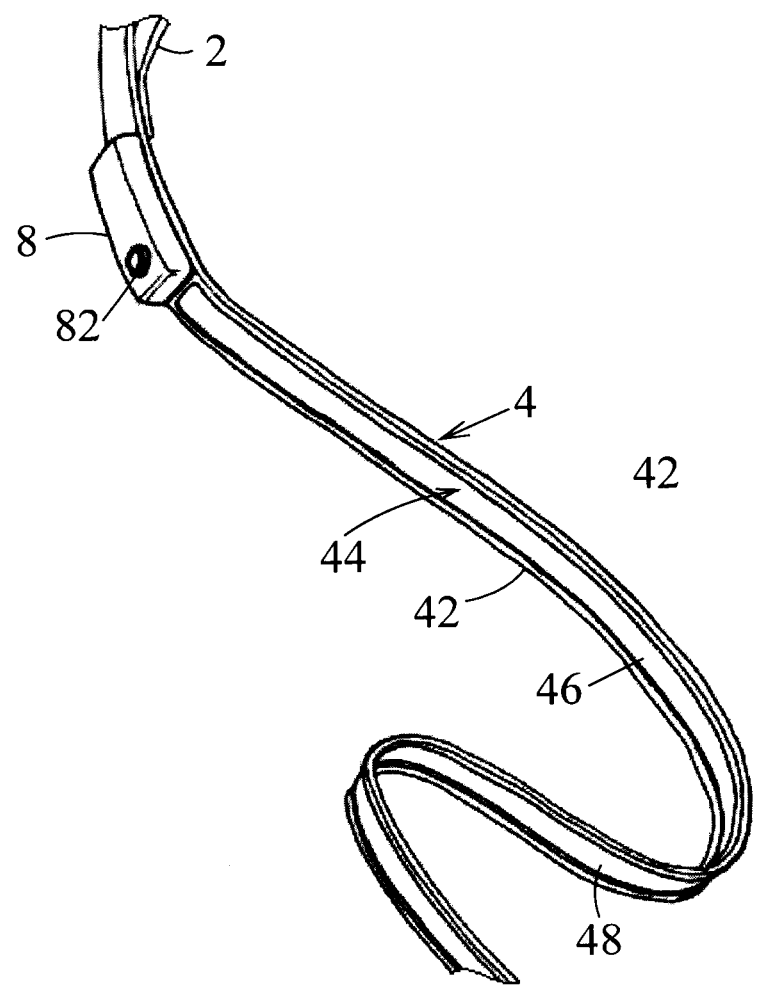
FIG. 2 is a perspective view of the leash shown in FIG. 1 having a power source near a hard loop.

FIG. 2 is a perspective view of the leash shown in FIG. 1 having a power source near a hand loop and showing that the strap 4 is flexible. Strap 4 in one embodiment has strong flexible sides 42 bounding translucent inserts 44 on one or both of the major surfaces 46 and 48.

Figure 3:
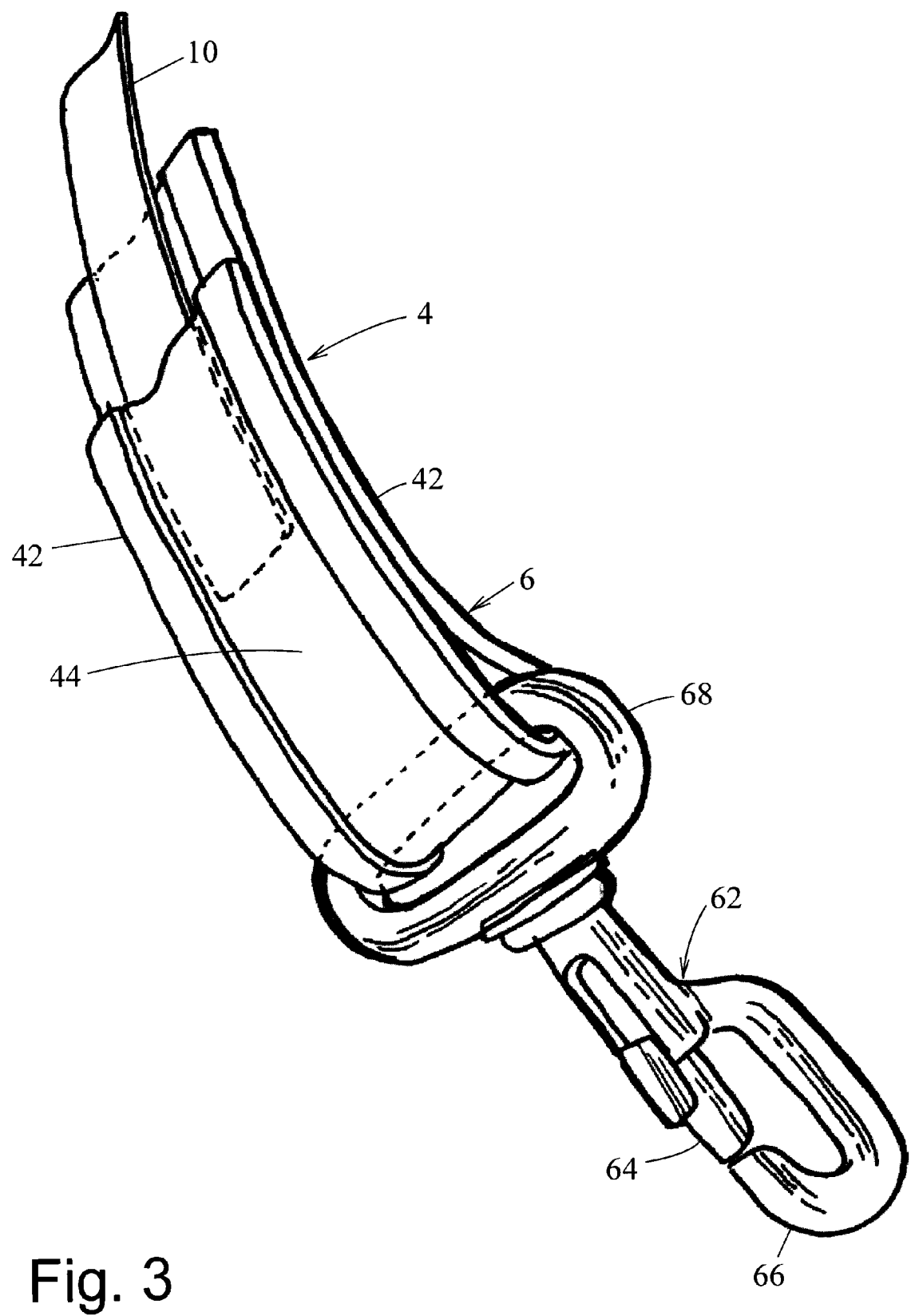
FIG. 3 is a detail of the pet hook end of the leash of FIGS. 1 and 2 showing the electroluminescent tape, strengthening sides and the translucent insert.

FIG. 3 is a detail of the pet hook end of the leash of FIGS. 1 and 2 showing the electroluminescent tape 10, strengthening sides 42 and the translucent insert 44. The leash connector 62 has a convectional spring loaded sliding closure 64 of hook 66 and a flat ring 68 connected to strap 4.

The strong flexible sides 42 and the strong translucent inserts 44 between the sides 42 are shown in FIG. 3. The opposing sides 42 may be bonded, welded or stitched to the translucent inserts 44. After folding around the flat ring 68, the side elements 42 may be bonded, welded or stitched together. The electroluminescent tape 10 floats within the translucent inserts 44 and does not undergo tensile stress. The side elements 42 are formed of fabric with reflective fibers or threads in one embodiment. The entire fabric of the side is reflective in another embodiment. The reflective sides are useful in rare occasions when an approaching vehicle sees only a side edge of the leash.

Figure 4:
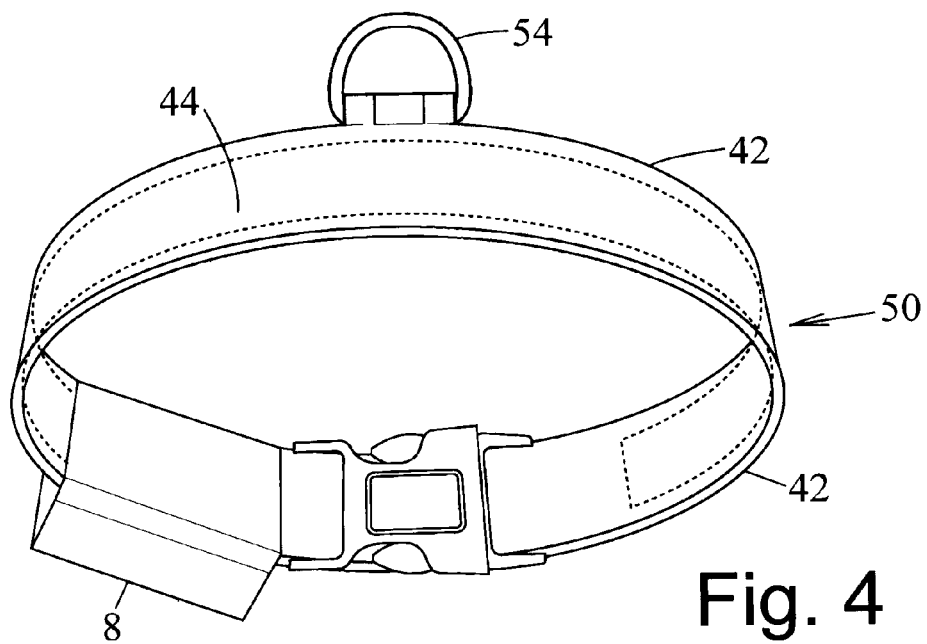
FIGS. 4 and 5 are perspective views of pet collars having a power source, electronics, electroluminescent tape, strengthening sides and the translucent insert.
Figure 5:
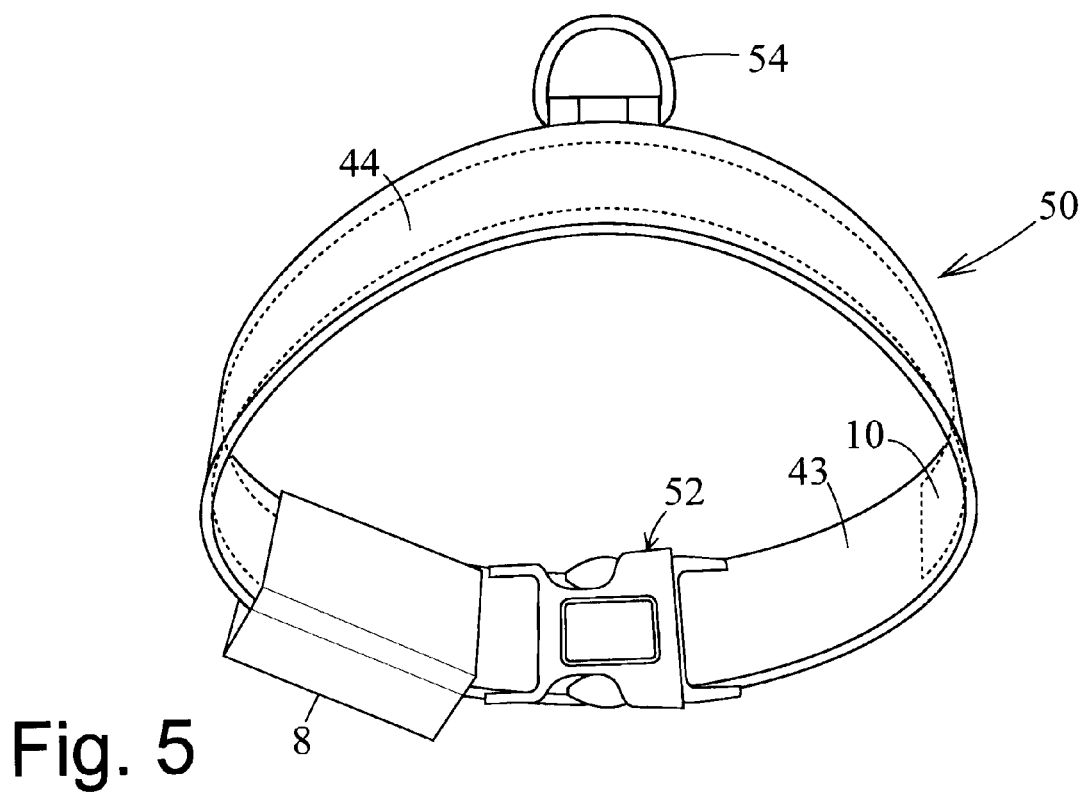

FIGS. 4 and 5 are perspective views of pet collars having a power source, electronics, electroluminescent tape, strengthening sides and the translucent insert. Cat and dog collars 50 of the example have buckles 52 and leash attachment rings 54, which are attached to the strong side edge portions 42 and end portions 43 that surround the translucent portions 44 of the collars 50. The electroluminescent tapes 10 float within the translucent portions 44 and are not stressed by pulls on rings 54 or collars 50. The power supplies 8 are clamped, riveted or otherwise attached to ends of the collars 50 near buckles 52.

Figure 6:
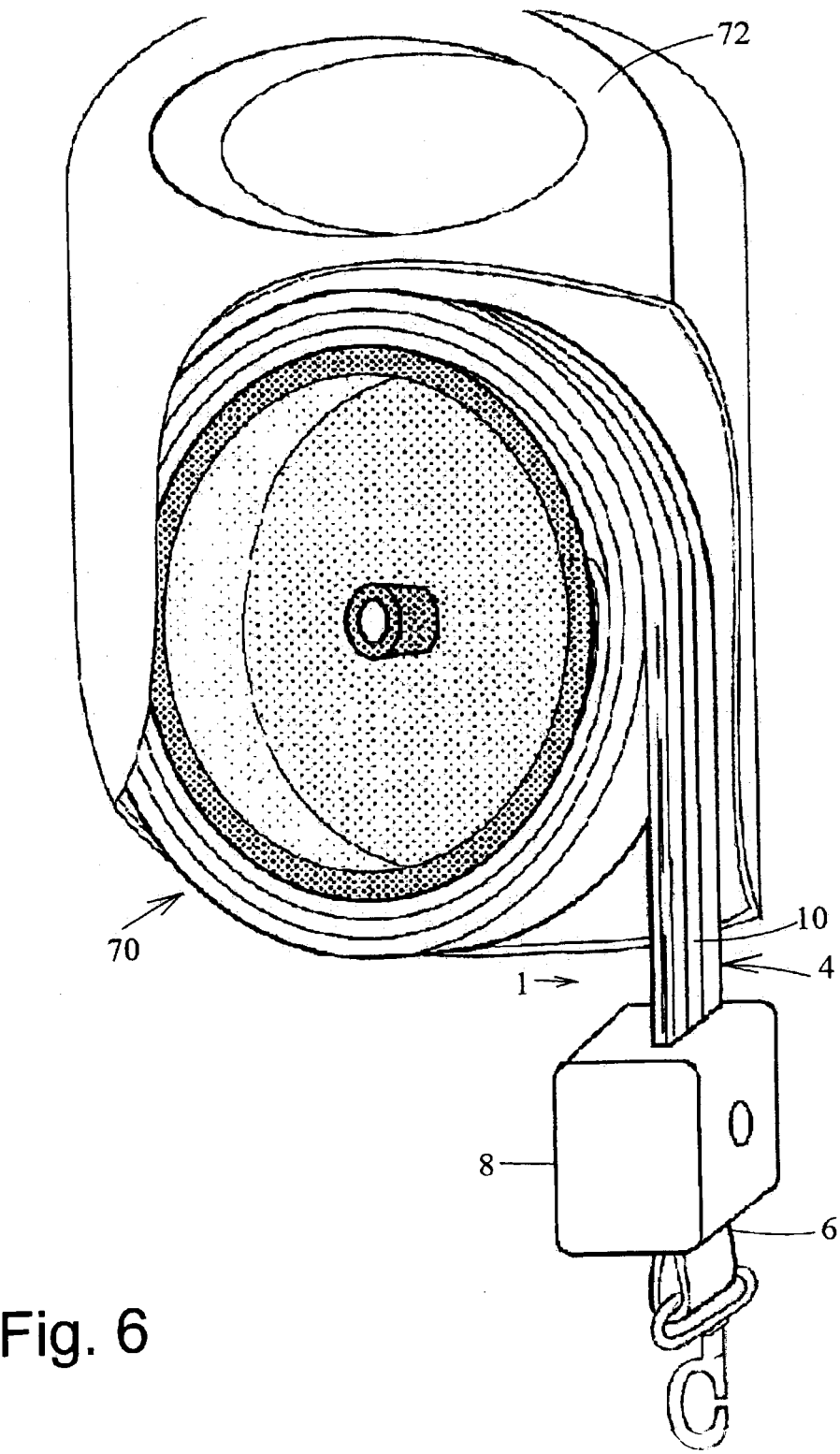
FIG. 6 is a view partly in cross-section showing a retractable leash with a rechargeable a power source, electronics, electroluminescent tape, strengthening sides and the translucent insert at the pet connection end of the leash.

FIG. 6 is a view partly in cross-section showing a retractable leash with a rechargeable a power source, electronics, electroluminescent tape, strengthening sides and the translucent insert at the pet connection end of the leash. A power supply is connected to a collar connection portion 6 of leash 1. A reel 70 with a handle 72 pays out, brakes or retracts the leash in a manner that is well known in dog leashes. A power supply 8 has batteries and an inverter. If a rechargeable battery is used, a plug or port is also included in the power supply. Wires from the inverter are connected to fine wires which run along opposite edges of the electroluminescent ribbon 10.

Figure 7:
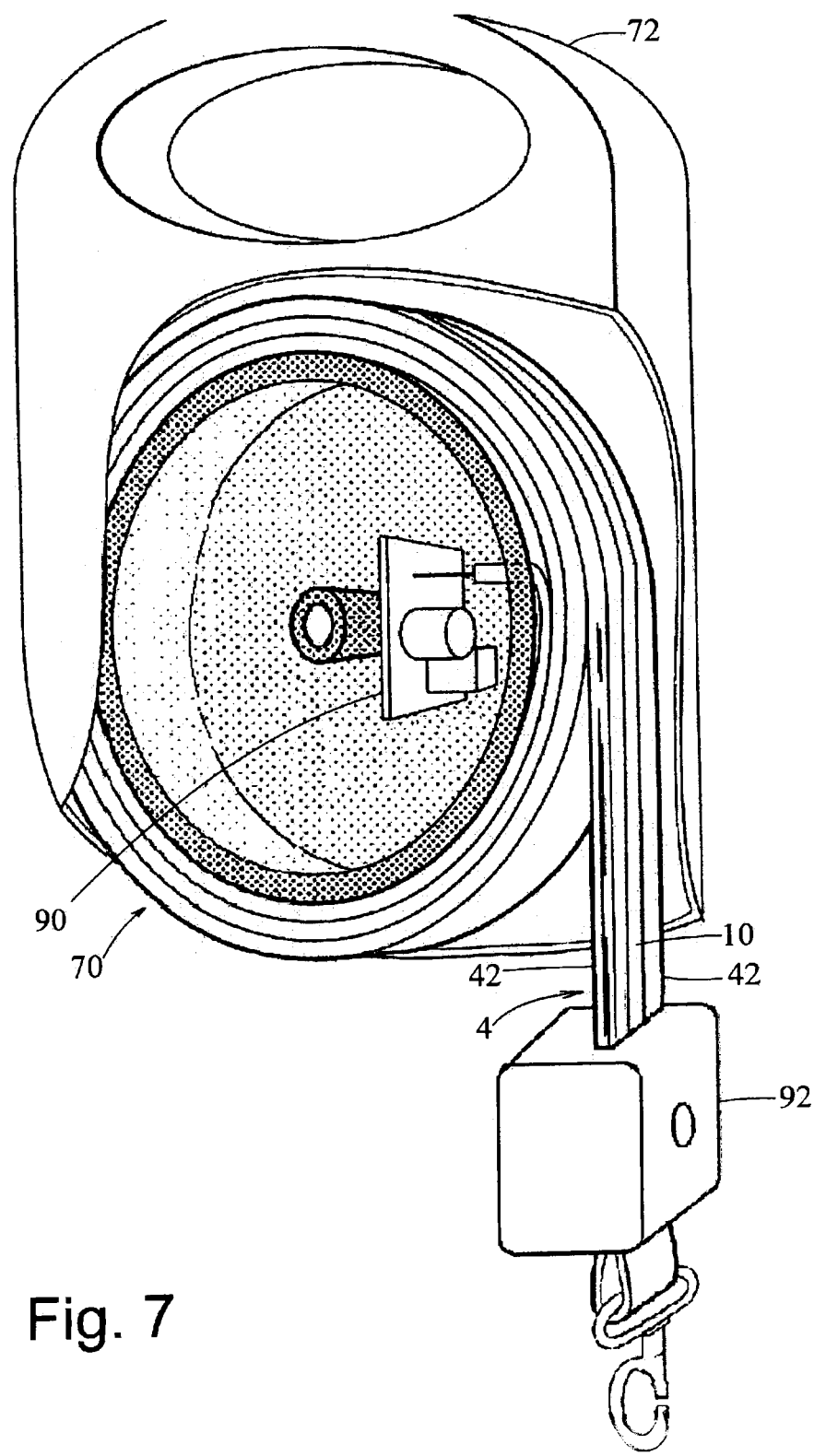
FIG. 7 is a view partly in cross-section showing a retractable leash with a rechargeable a power source, electronics, electroluminescent tape, strengthening sides and the translucent insert at the handle end of the retractable leash.

FIG. 7 is a view partly in cross-section showing a retractable leash with a rechargeable a power source, electronics, electroluminescent tape, strengthening sides and the translucent insert at the handle end of the retractable leash. In the embodiment shown in FIG. 7, a reel 70 with handle 72 holds an inverter 90 at its center. A battery pack 92 is connected to the collar end of the leash. Consequently the animal carries the heavier batteries. The batteries in battery pack 92 supply power to the inverter held within the center if reel 70 through wires that run through the sides 42 of the leash strap 4. The wires that supply the DC current are larger than the fine AC wires from the inverter that run along opposite sides of the electroluminescent ribbon 10 or are printed circuits on the non-luminescent side of the electroluminescent tape.

Figure 8:
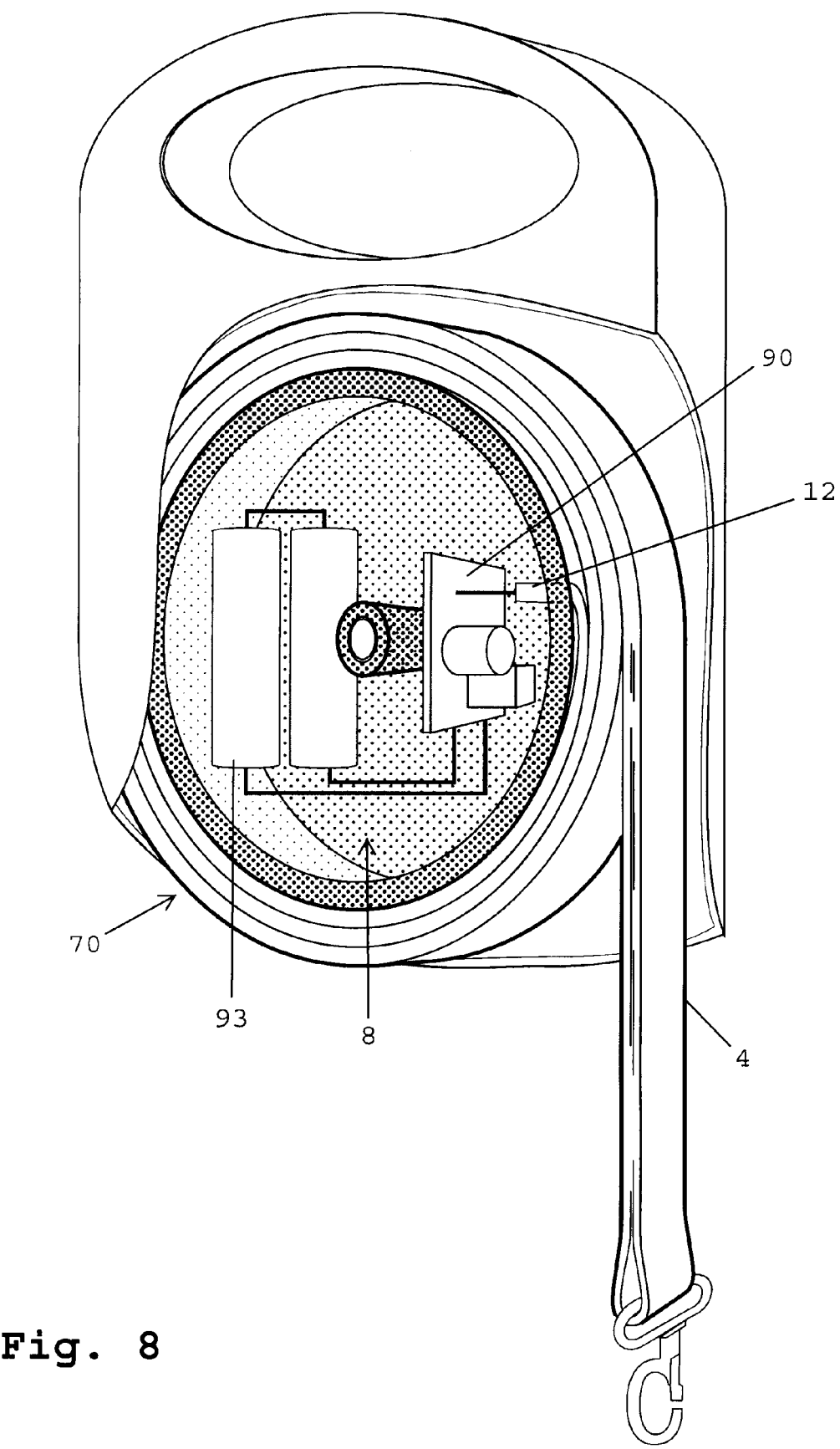
FIG. 8 is a perspective view, partially in cross section, which shows a battery and inverter.

FIG. 8 shows a power supply 8 including an inverter 90 and batteries 93 are mounted within reel 70 for the leash 4 with the electroluminescent tape. For an electroluminescent tape two wire connectors 12 between the inverter and ends of opposite sides of the tape are used. One wire is shown as an example. The power supply 8 with inverter 90 and batteries 93 rotate with the reel 70. No special connections are required. When the batteries are rechargeable a port or plug is provided near the end 6 of leash 4 and wires running along the leash lead to the batteries for recharging. In one embodiment a port or plug is accessible in a side of the real for recharging batteries.

Figure 9:
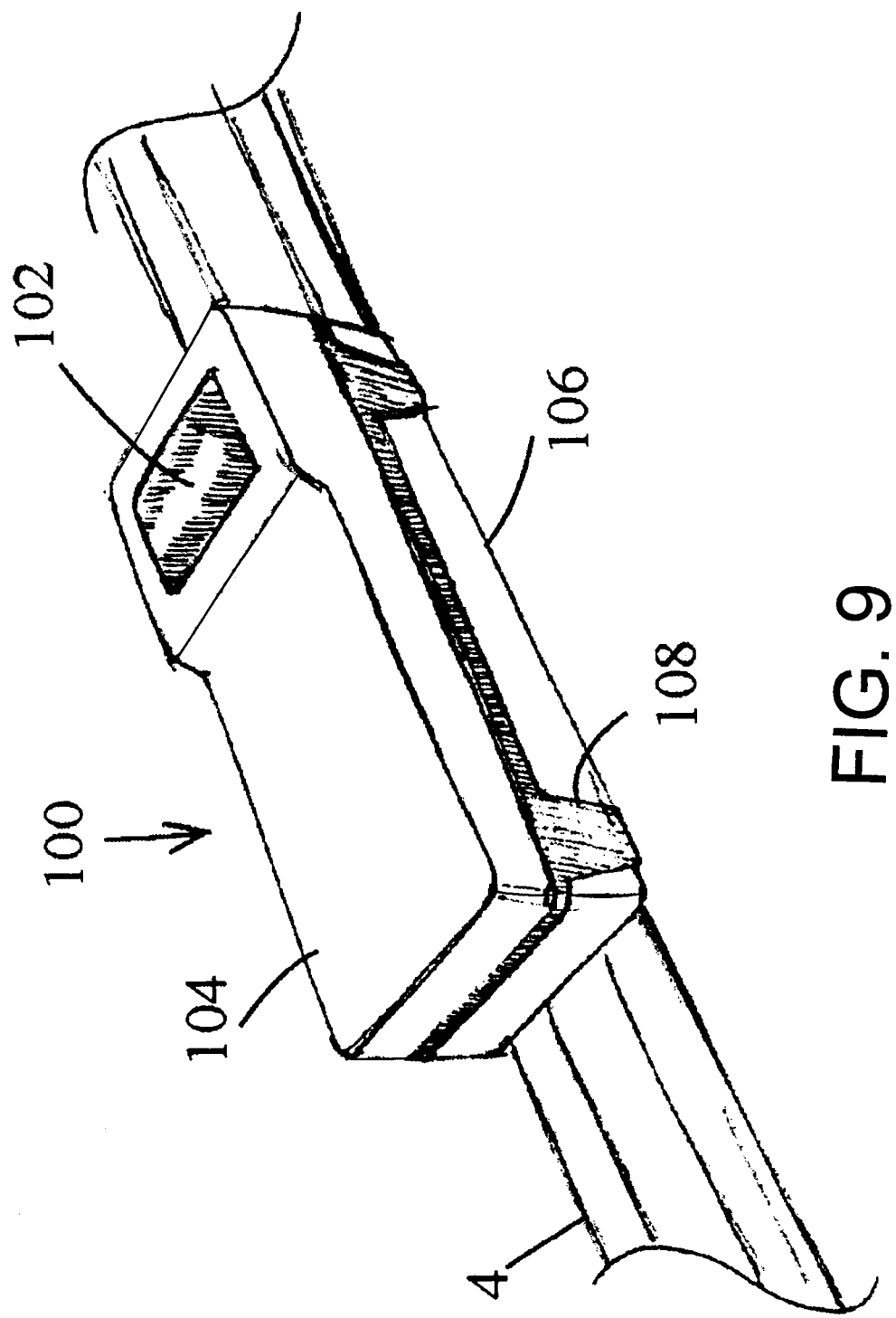
FIG. 9 shows a battery pack attached to a leash.

FIG. 9 shows a battery pack attached to a leash. A battery pack 100 has a push button switch 102, a top 104, a base 106 and a gasket 108 sealing the joined top and base against rain and moisture.

FIG. 10 is a side elevation of a battery and electronics housing for attachment to a collar or leash. FIG. 11 is an end elevation of the housing shown in FIG. 10. FIG. 12 is a top view of the housing shown in FIGS. 10 and 11. A housing assembly 130 for attachment to a collar or leash has a base 132 and a lid 134. The lid is made of a flexible material, for example a plastic material, and has a push button 136 at its center.

The button 136 is molded into the top plastics. The top of the plastic housing is thin molded around the button to allow the plastics to flex down and push the switch on the circuit card.

Figure 14:
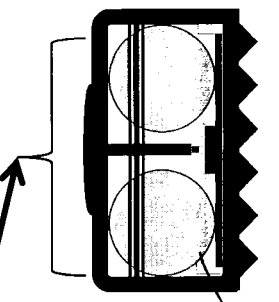
FIG. 14 is a cross-section end view of the housing shown in FIGS. 10-12.
Figure 13:
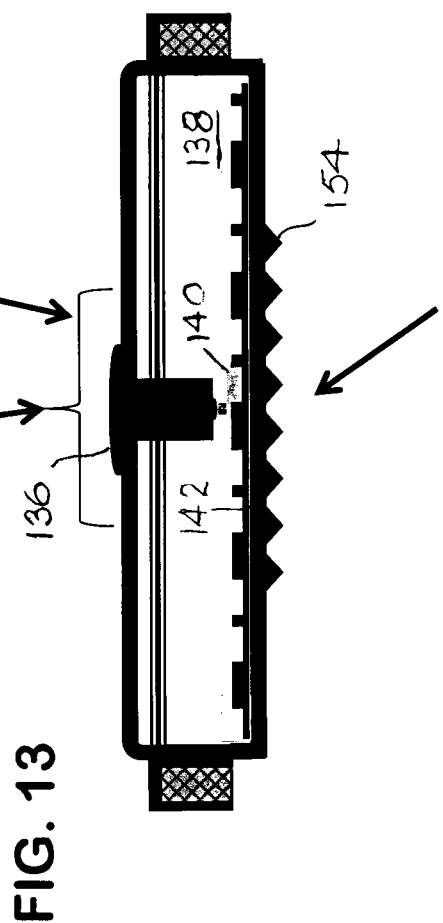
FIG. 13 is a cross-sectional side view of the housing shown in FIGS. 10-12.

FIG. 13 is a cross-sectional side view of the housing shown in FIGS. 10-12. FIG. 14 is a cross-section end view of the housing shown in FIGS. 10-12. The base 132 has a rectangular box cavity 138 for holding an on-off dual stable switch 140 secured to the bottom 142 of base 132. The base cavity holds the power supply batteries 144 and the electronic components for illuminating electroluminescent strap outputs. As shown in FIG. 12, the base 132 has two outward extending cylinders 146 holding internally threaded 147 bronze inserts 148 with knurled exteriors 147. The lid has two complementary outward extending lugs 152 with central holes which cover the cylinders 146 and the knurled inserts 148 for inserting brass screws which hold the removable lid 134 on the base 132.

A flat knurled central outer portion 154 of the bottom 142 of the base 132 prevents sliding of the housing on the collar or leash.

Figure 16:
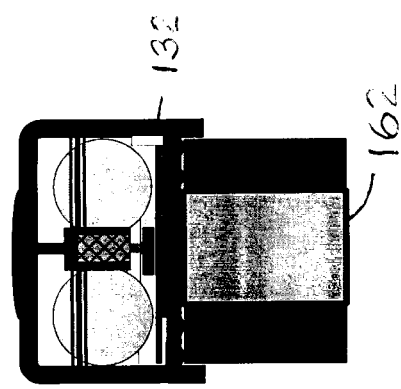
FIG. 16 is a cross-sectional end elevation of a housing shown in FIGS. 10-14 attached to a collar.
Figure 15:
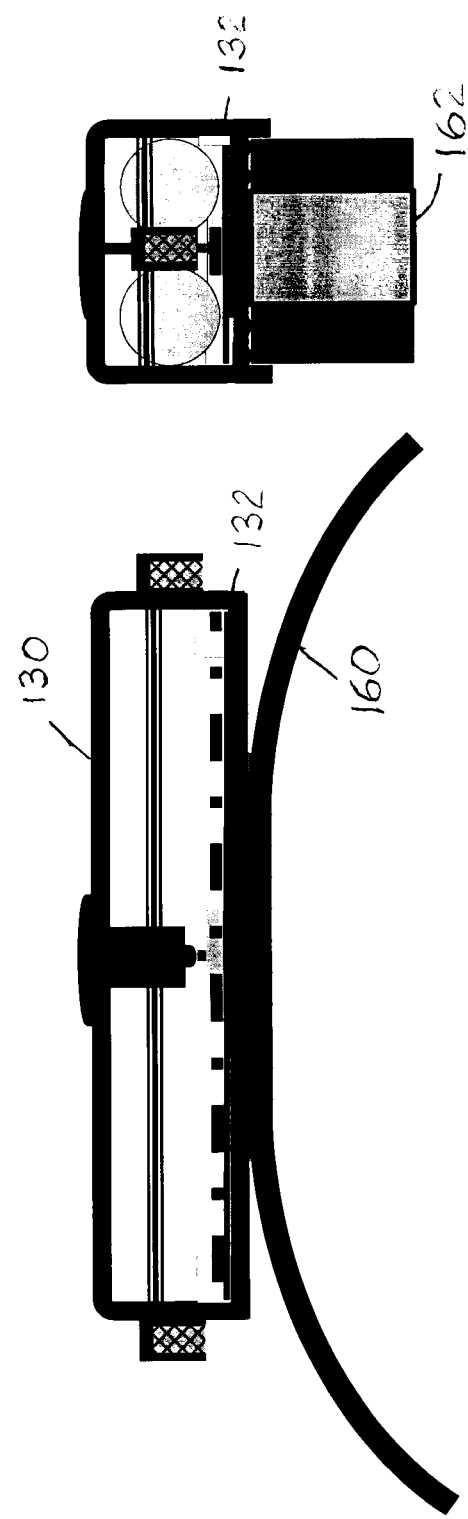
FIG. 15 is a cross-sectional side elevation of a housing shown in FIGS. 10-14 attached to a collar.

FIG. 15 is a cross-sectional side elevation of a housing shown in FIGS. 10-14 attached to a collar. FIG. 16 is a cross-sectional end elevation of a housing shown in FIGS. 10-14 attached to a collar. FIGS. 15 and 16 show the housing 130 mounted on a collar 160. A wide electroluminescent strip 162 surrounds the collar and extends out of and back into the base 132 of the housing 130 for powering with the electronic circuit and the power supply in the housing.

Figure 17:
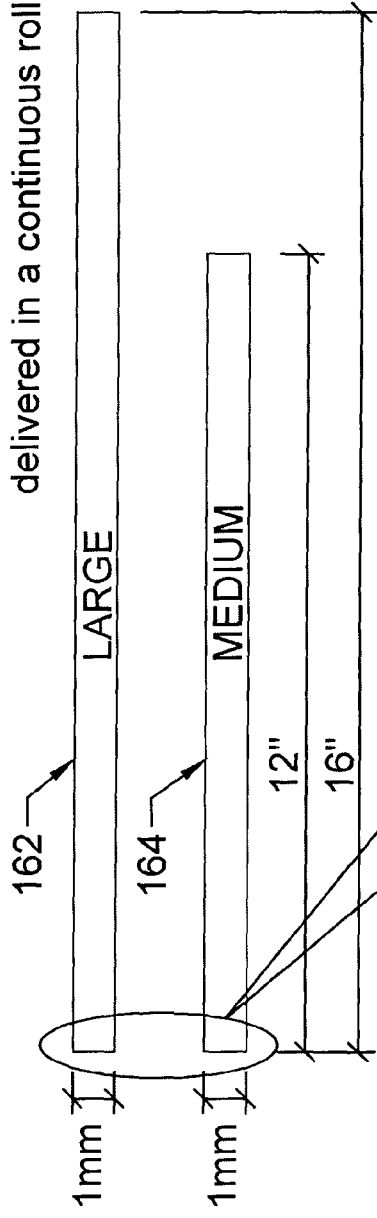
FIG. 17 is a detail of electro illumination strips used on a collar.
Figure 18:
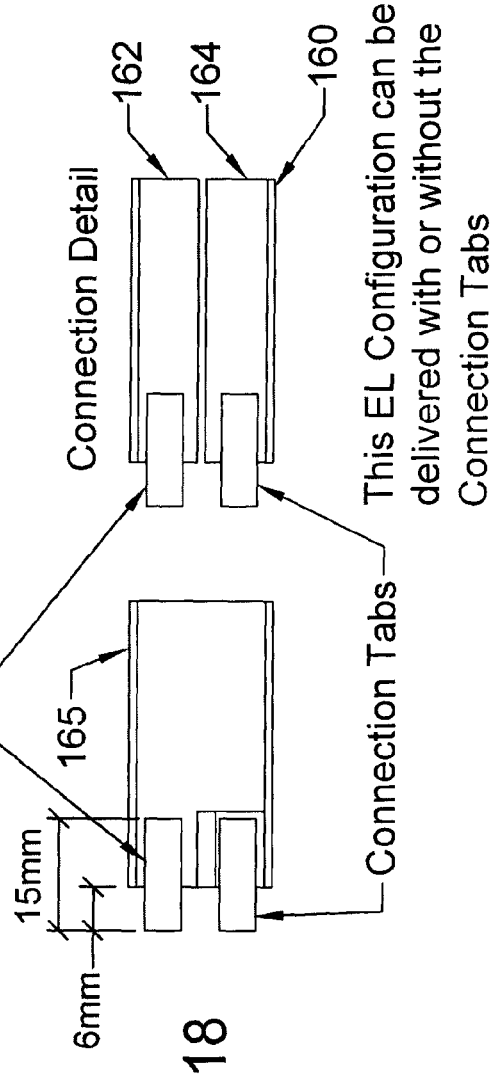
FIG. 18 is a detail of connection tabs on the strips shown in FIG. 17.

FIG. 17 is a detail of electro illumination strips used on a collar. FIG. 18 is a detail of connection tabs on the strips shown in FIG. 17.

Parallel electroluminescent strips 164, 166 are shown on collar 160 or the leash. FIGS. 17 and 18 show electroluminescent strip specifications for the medium and large collar sizes. Electroluminescent strips can be cut to the lengths below or can be delivered in a continuous roll. The electroluminescent configuration can be delivered with or without the connection tabs. The connection tabs 168 extend from the strips into the housing for connection to the electronic circuit and power supply. FIG. 18 shows one wide electroluminescent strip 165 and two parallel electroluminescent strips 162 and 164.

Figure 19:
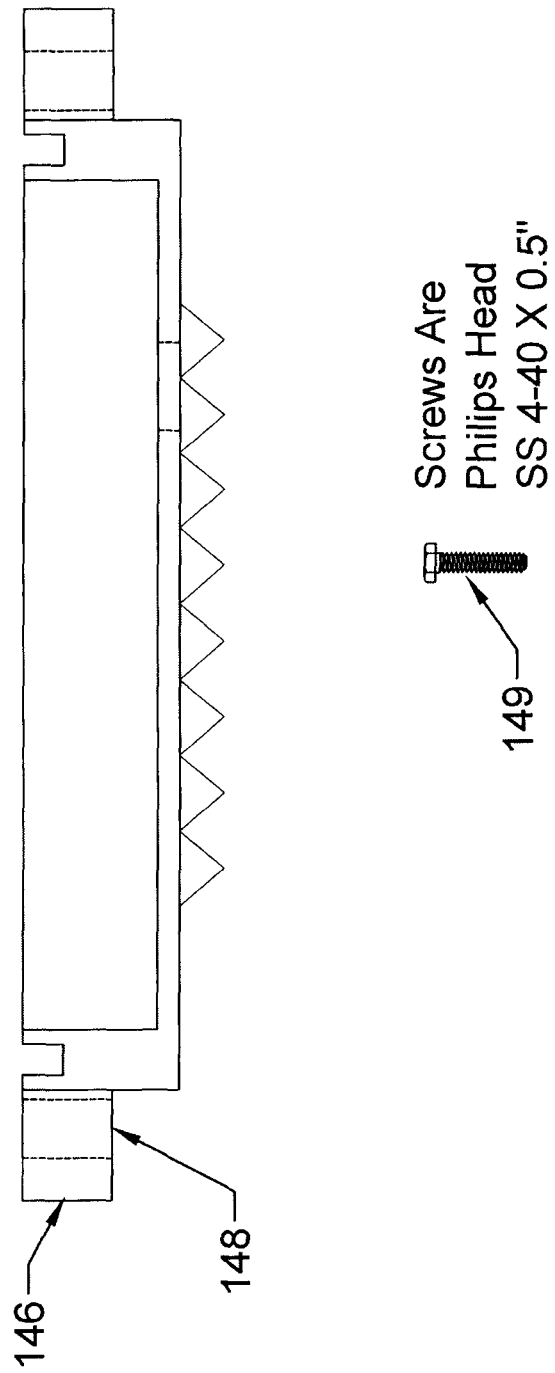
FIG. 19 is a detail of the housing shown in side elevation.

FIG. 19 is a detail of the housing shown in side elevation. The brass-knurled inserts 148 molded or pressed into cylinders 146 and the Philips head set screws 149 for connecting the lid lugs 152 to the inserts 148 and base cylinders 146 are shown.

FIG. 20 is the corner detail of a housing base and lid. FIG. 21 is a detail of an O-ring installed in the housing base groove. The base 132 has a peripheral groove 172 along the upper edge 133 of the base. An O-ring 173 is placed in the peripheral groove 172 of the base. A peripheral extension 174 on the outer edge 135 of lid 134 fits tightly into the peripheral groove 172 of the base. The O-ring 173 is compressed to seal groove 172 and projection 174 upon tightening the set screws 149 that extend through the central opening 153 in lugs 152 into the interiorly threaded knurled inserts 148.

Figure 22:
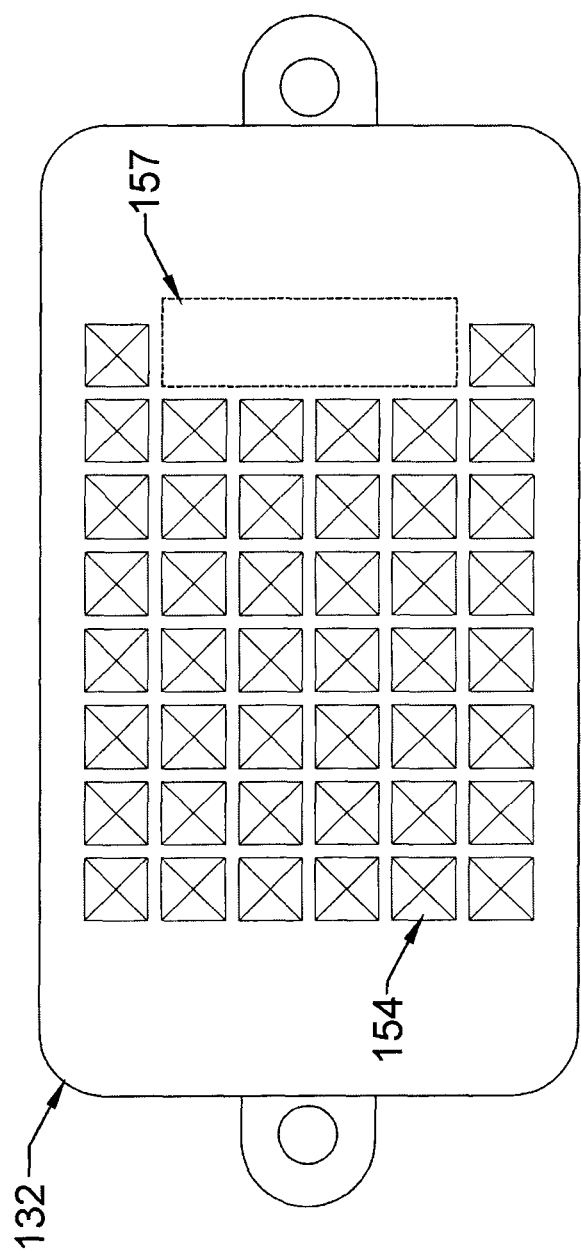
FIG. 22 is a bottom view of the housing base.

FIG. 22 is a bottom view of the housing base. The outside bottom of base 132 has a flat or curved knurled central portion 154 to prevent sliding of the housing 130 along the leash or collar. The opening 157 for the electroluminescent strips or connectors is within an outer row of the knurls. The opening may be potted around the strips or connectors to keep the housing dry.

Figure 23:
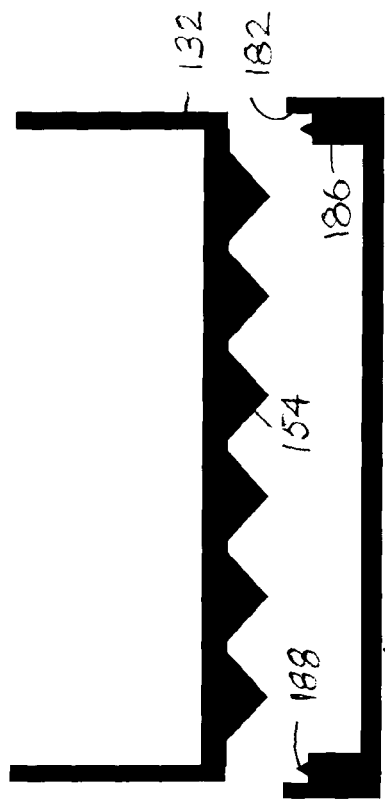
FIG. 23 is a cross-sectional details of the housing base and retention clamp.

FIG. 23 is a cross-sectional details of the housing base and retention clamp. A keeper 180 is secured to the base around the knurls to secure the housing to the collar or leash. To permanently secure the keeper 180 to the base 132, guides 182 are provided on the sides 184 of the keeper to press onto the outer sides of the base 132. Rectangular spacing blocks 186 are positioned inside the sides, and elongated energy directors 188 are provided on the blocks to weld the keeper to the base 132 to permanently join the housing and the collar or leash.

Alternatively, the spacer blocks may be threaded and set screws may extend from the housing bottom into the thread blocks to secure the housing on the leash or collar.

Figure 24:
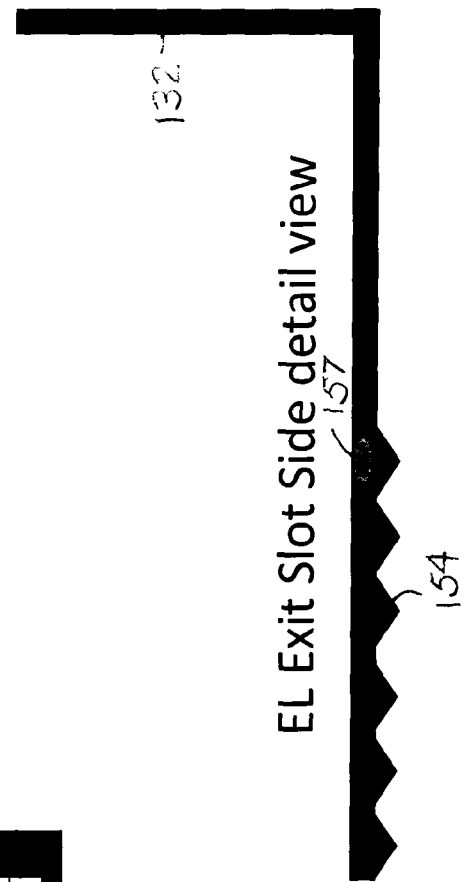
FIG. 24 is a cross-sectional side view detail of the electroluminescent tape passage from the housing.

FIG. 24 is a cross-sectional side view detail of the electroluminescent tape passage opening 157 from the housing.

Figure 25:
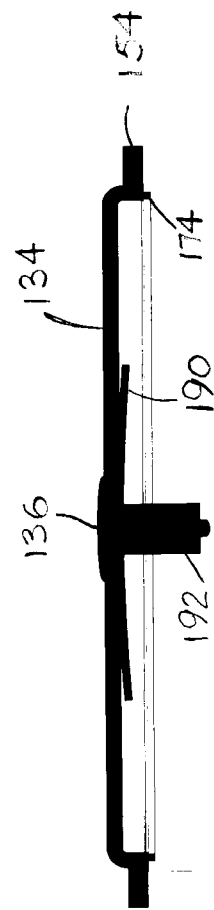
FIG. 25 is a cross-sectional side view detail of the lid.
Figure 26:
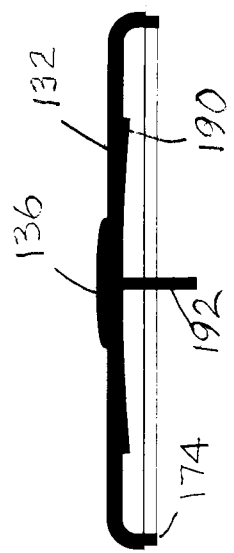
FIG. 26 is a cross-sectional end view detail of the lid.

FIG. 25 is a cross-sectional side view detail of the lid. FIG. 26 is a cross-sectional end view detail of the lid. The lid 134 is shown with the extended lugs 154 which join the lid 134 to the base 132. The peripheral edge sealing extensions 154 are also shown. An elliptical spring 190 is formed or connected in the inside center of lid 134. A switch-operating extension 192 extends inward from push button 136. The switch operation extension 192 is thin and relatively wide in the longitudinal direction of the housing, as shown in FIG. 25, and relatively narrow in the cross direction, as shown in FIG. 26.

While the invention has been described with reference to specific embodiments, modifications and variations of the invention may be constructed without departing from the scope of the invention, which is defined in the following claims.

We claim:

1. Apparatus comprising:
   a pet or child restraint having an elongated flexible body,
   an electroluminescent strip mounted on the elongated flexible body,
   a power supply housing connected to the electroluminescent strip and mounted on the elongated flexible body,
   the power supply housing having a base connected to the electroluminescent strip and mounted on the elongated flexible body,
   a removable lid connected to the base, and
   batteries and an electronic circuit mounted in the housing, the base having a knurled outer surface portion for positioning against the elongated flexible body, and a keeper mounted on an opposite side of the elongated flexible body and secured to the base for pressing the knurled surface tightly against the elongated flexible body.

2. The apparatus of claim 1, wherein the removable lid has a push button, and a flexible portion surrounding the push button.

3. The apparatus of claim 1, further comprising an off-on switch mounted on an inside bottom of the base, and wherein the lid further comprises an inward extension extending from the push button to the switch for turning the switch on or off.

4. The apparatus of claim 1, wherein the base has a peripheral groove and the lid has a complementary peripheral extension for fitting in the groove, and further comprising an O-ring positioned in the groove for compression when forcing the peripheral extension against the O-ring for sealing the peripheral extension in the groove.

5. The apparatus of claim 1, further comprising cylinders extending from the base and inserts fixed in the cylinders, complementary lugs extending outward from the lid with holes in the lugs and fasteners extending through the holes in the lugs into the inserts for securing the lid to the base.

6. The apparatus of claim 1, further comprising an opening in the base is partially surrounded by the knurled portion.

7. The apparatus of claim 1, comprising a safety device adapted for use in mobile restraint or control of animals or in safety clothing for people or harnesses for children, having an electroluminescent wire or electroluminescent ribbon that is sheathed in a woven or braided mesh to allow the wire or ribbon to be strong enough to absorb the tensile forces associated with the use of the device and visually translucent enough to allow the illumination from the electroluminescent wire or ribbon to be visible.

8. The apparatus of claim 7, wherein the sheath is transparent, translucent, or has a transparent or translucent section to allow the light to be visible.

9. The apparatus of claim 8, further comprising an inverter/battery pack connected to the electroluminescent wire or ribbon directly or with a connector, wherein the inverter/battery pack is mounted inside a housing having a lid.

10. The apparatus of claim 7, wherein the safety device is a leash.

11. The apparatus of claim 10, wherein the leash utilizes a reeling device to retract the restraint.

12. The apparatus of claim 11, wherein the reeling spool incorporates an inverter and battery pack inside the center of the spool, allowing for a direct connection to the electroluminescent wire or ribbon, eliminating moving contacts, and wherein the electronic circuit and batteries are on a plane that bisects the interior diameter of the reel so that the printed circuit board is in the same plane as the ribbon.

13. The apparatus of claim 12, wherein the batteries are rechargeable and a port or plug is constructed in a side of the spool for charging the batteries.

14. The apparatus of claim 12, wherein the reeling spool incorporates an inverter and rechargeable battery inside the center of the spool allowing for a direct connection to the electroluminescent wire or ribbon, eliminating moving contacts, a port or plug for insertion to a charging device is at the end of the leash, and a printed circuit on the back of the electroluminescent ribbon provides power to the rechargeable battery.

15. The apparatus of claim 7, wherein the inverter/battery pack incorporates an inverter allowing for a direct connection to the electroluminescent wire or ribbon, eliminating moving contacts, a rechargeable battery pack is mounted on the flexible body and includes a plug or port for connection to a charging device, and a printed circuit on the back of the electroluminescent ribbon provides power to the electronics.

16. The apparatus of claim 9, wherein an inverter and rechargeable battery pack is mounted on a pet collar and includes a plug for insertion to a charging device.

17. The apparatus of claim 16, wherein the inverter is encapsulated in epoxy, silicone, or other di-electric sound deadening material.

18. The apparatus of claim 7, wherein the safety device places the battery pack on a pet collar attachment so that the pet carries the battery pack.

* * * * *